United States Patent
Adams

(10) Patent No.: US 7,299,740 B2
(45) Date of Patent: Nov. 27, 2007

(54) RECIPROCATING AXIAL DISPLACEMENT DEVICE

(75) Inventor: Andrew W. Adams, Less's Summit, MO (US)

(73) Assignee: Haldex Brake Corporation, Kansas City, MO (US)

( * ) Notice: Subject to any disclaimer, the term of this patent is extended or adjusted under 35 U.S.C. 154(b) by 547 days.

(21) Appl. No.: 10/939,625

(22) Filed: Sep. 13, 2004

(65) Prior Publication Data

US 2006/0053830 A1    Mar. 16, 2006

(51) Int. Cl.
 *F01B 3/00* (2006.01)
(52) U.S. Cl. ............... 92/71; 92/12.2; 91/505
(58) Field of Classification Search ............. 92/71, 92/57, 12.2; 91/502, 505
See application file for complete search history.

(56) References Cited

U.S. PATENT DOCUMENTS

| | | | |
|---|---|---|---|
| 3,667,876 A * | 6/1972 | Boyd | 418/68 |
| 4,575,324 A | 3/1986 | Sommer et al. | 418/217 |
| 4,638,547 A | 1/1987 | Waller | 29/558 |
| 4,756,239 A | 7/1988 | Hattori et al. | 92/71 |
| 4,854,837 A | 8/1989 | Cordray | 417/492 |
| 5,036,809 A | 8/1991 | Goodman | 123/241 |
| 5,076,764 A | 12/1991 | Kawai et al. | 417/269 |
| 5,394,698 A | 3/1995 | Takagi et al. | 60/438 |
| 5,517,952 A * | 5/1996 | Wielenga | 123/45 R |
| 5,626,463 A | 5/1997 | Kimura et al. | 417/269 |
| 5,655,953 A | 8/1997 | Murakami et al. | 451/62 |
| 6,007,541 A * | 12/1999 | Scott | 606/82 |
| 6,343,575 B1 | 2/2002 | Deckard | 123/43 |
| 6,439,857 B1 | 8/2002 | Koelzer et al. | 417/222.1 |
| 6,481,393 B1 | 11/2002 | Drew | 123/56.1 |

* cited by examiner

*Primary Examiner*—Igor Kershteyn
(74) *Attorney, Agent, or Firm*—St. Onge Steward Johnston & Reens LLC

(57) ABSTRACT

A reciprocating axial displacement mechanism is disclosed generally comprising a housing, a rotating device, a displacement device having first and second undulating surfaces disposed in the housing, and a cam connected to the rotating device and disposed between the first and second undulating surfaces. The cam either has an undulating shape or has first and second undulating surfaces such that, as the cam rotates with the rotating device, the cam slides along the first and second undulating surfaces of the displacement device to cause the displacement device to move back and forth along the longitudinal axis of the rotating device. In certain embodiments, the displacement device is a pumping device, or an actuator for a pumping device, in a compressor.

26 Claims, 5 Drawing Sheets

RECIPROCATING AXIAL DISPLACEMENT DEVICE

FIELD OF THE INVENTION

The present invention relates to an apparatus for producing reciprocal motion. More specifically, the invention relates to a mechanism that causes reciprocal displacement along the longitudinal axis of a rotating device, such as the shaft of a pump.

BACKGROUND OF THE INVENTION

Devices for causing reciprocal displacement along the longitudinal axis of a rotating device, such as the shaft of a pump, are generally well known in the art. These devices typically use the rotary motion of the rotating device, which may, for example, comprise a drive shaft in a compressor, to produce the reciprocating motion desired, which may, for example, be the motion required to drive a pumping device, such as a piston for compressing fluid.

One common way of transforming rotary motion into linear motion, particularly in pumps, is by the use of a swash or wobble plate, or similar mechanism, coupled to the shaft that employs a combination of both rotating and non-rotating parts to produce the reciprocating motion along the longitudinal axis of the shaft. The swash plate is typically coupled to one or more pumping devices, such as pistons, such that, when the plate pivots, the pistons reciprocate within piston channels of a cylinder block, alternately drawing fluid to be compressed into the channels of a cylinder block and subsequently compressing and discharging the fluid.

These pumps operate by employing a variety of different arrangements that utilize the rotational force of the drive shaft to make the swash plate pivot, such as an actuating assembly with a slanted surface underneath the swash plate, as disclosed in U.S. Pat. No. 6,439,857 to Koelzer and assigned to the assignee of the present application, an assembly of rotating and non-rotating plates, as disclosed in U.S. Pat. No. 5,626,463 to Kimura, and a rotatable cylinder block, as disclosed in U.S. Pat. No. 5,394,698 to Takagi. In these ways, the rotational force of the shaft is converted into linear motion of the pistons along the rotational axis of the shaft, enabling the pistons to alternately perform the functions of suction and compression, and thus, fluid is first drawn into a piston channel and is subsequently compressed and discharged from the piston channel.

One disadvantage of these types of pumps, however, is that they result in side loading—i.e., the pistons tend to tilt slightly within the piston channels as a result of the pivoting or wobbling motion of the plate. When side loading exists, the piston places greater stress on certain portions of the piston channel, resulting in greater wear and tear. Moreover, in some cases, severe side loading can result in a loss of an adequate seal between the piston and piston channel, compromising the integrity of the compression chamber.

In some pump designs, this undesired effect has been somewhat alleviated by the use of a wave shaped cam instead of a swash or wobble plate, such as those disclosed in U.S. Pat. No. 4,756,239 to Hattori et al., U.S. Pat. No. 5,655,953 to Murakami et al., and U.S. Pat. No. 6,481,393 to Drew. Unlike the pumps employing a swash or wobble plate described above, the rotating cam does not need to pivot. Instead, its wave shape creates a continually rising and falling surface as it rotates, thereby causing the pistons that are coupled to it to rise and fall as the cam rotates.

However, one problem with these devices is that, in order for the cam to drive the pistons in this manner, the cam must be coupled to the pistons, which must be coupled by some mechanism that permits relative motion between the cam and the piston stem. For example, in the aforementioned '239 and '393 patents, bearings are employed. In the aforementioned '953 patent, the pistons are coupled to the cam via semispherical shoes.

These arrangements result in a number of disadvantages. First, this relative motion between the piston and the cam still results in a certain degree of side loading, and thus, durability and compression may still be compromised. Moreover, they require multiple, complex parts, which are typically expensive and difficult to manufacture.

What is desired, therefore, is an axial displacement mechanism that minimizes the amount of side loading for a pumping device. What is further desired is an axial displacement mechanism for producing a pumping motion in a pump that is inexpensive to manufacture. What is also desired is an axial displacement mechanism for producing a pumping motion in a pump that is easy to assemble.

SUMMARY OF THE INVENTION

Accordingly, it is an object of the present invention to provide an axial displacement mechanism that is able to produce a pumping motion in a pump without requiring parts that pivot about the direction of motion of the pumping device.

It is a further object of the present invention to provide an axial displacement mechanism that is able to produce a pumping motion in a pump that does not require a lot of parts.

It is yet another object of the present invention to provide an axial displacement mechanism that is able to produce a pumping motion in a pump that is not complex.

In order to overcome the deficiencies of the prior art and to achieve at least some of the objects and advantages listed, the invention comprises an axial displacement mechanism including a housing, a rotating device disposed in the housing, the rotating device having a rotational axis, an undulating cam connected to the rotating device, and a displacement device disposed in the housing, the displacement device having first and second undulating surfaces, wherein the undulating cam is at least partially disposed between the first and second undulating surfaces of the displacement device such that, as the rotating device rotates relative to the displacement device, the undulating cam slides along the first and second undulating surfaces of the displacement device to displace the displacement device back and forth along the rotational axis of the rotating device.

In another embodiment, the invention comprises an axial displacement mechanism including a housing, a rotating device disposed in the housing, the rotating device having a rotational axis, a cam connected to the rotating device, the cam having first and second undulating surfaces, and wherein the cam is at least partially disposed between the first and second undulating surfaces of the displacement device such that, as the rotating device rotates relative to the displacement device, the first surface of the cam slides along the first surface of the displacement device and the second surface of the cam slides along the second surface of the displacement device to displace the displacement device back and forth along the rotational axis of the rotating device.

In yet another embodiment, the invention comprises an axial displacement mechanism including a pump housing having at least one piston channel, a shaft disposed in the pump housing, the shaft having a rotational axis, an undulating cam connected to the shaft, an actuator disposed in the pump housing, the actuator having first and second undulating surfaces, and at least one piston coupled to the actuator and slidably disposed in the at least one piston channel, wherein the undulating cam is at least partially disposed between the first and second undulating surfaces of the actuator such that, as the shaft rotates relative to the actuator, the undulating cam slides along the first and second undulating surfaces of the actuator to displace the at least one piston back and forth within the at least one piston channel.

DETAILED DESCRIPTION OF THE DRAWINGS

Figure 1:
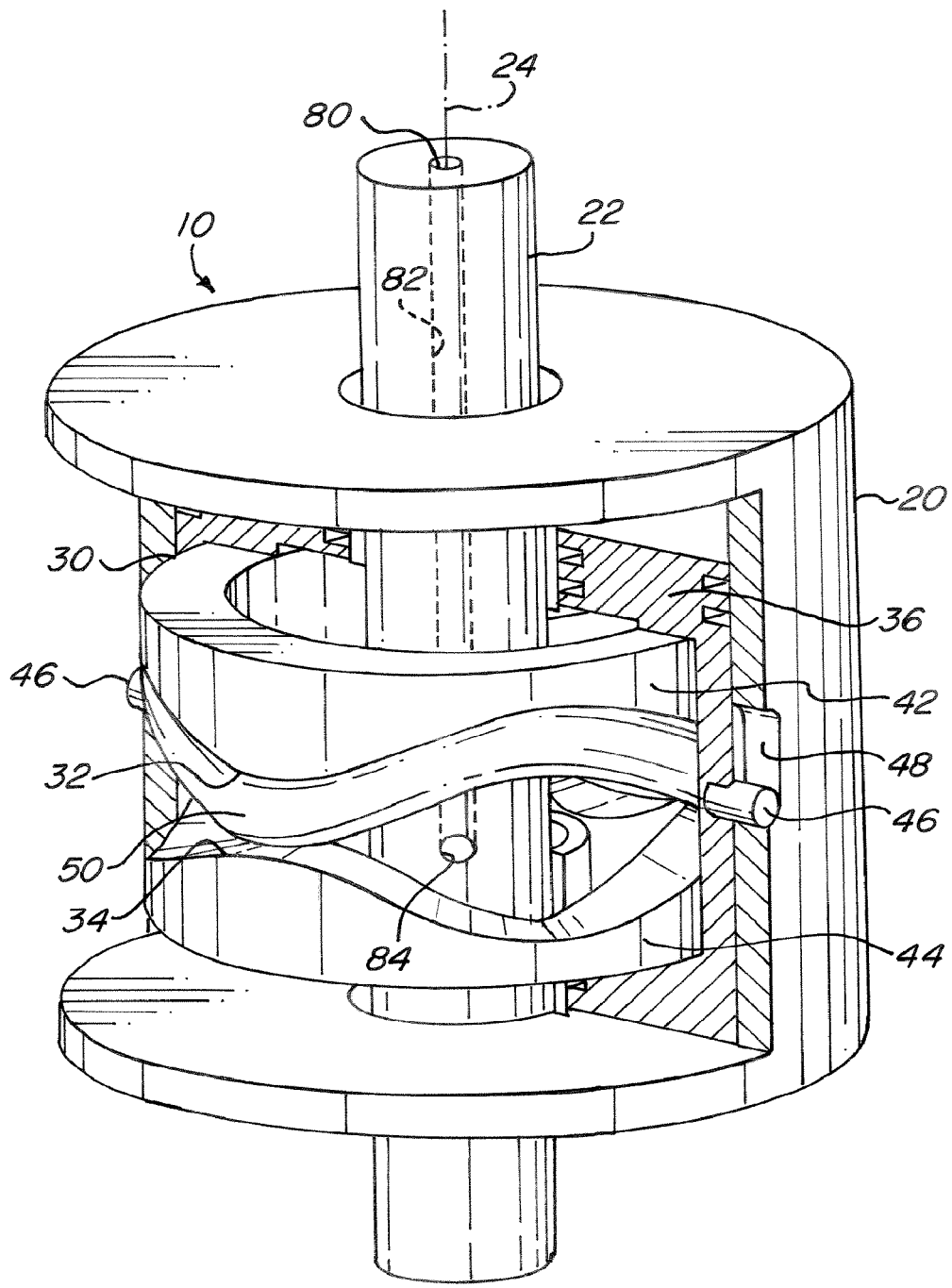
FIG. 1 is an isometric view of a reciprocating axial displacement mechanism in accordance with the invention.

The basic components of one embodiment of a reciprocating axial displacement mechanism 10 in accordance with the invention are illustrated in FIG. 1. As used in the description, the terms "top," "bottom," "above," "below," "over," "under," "on top," "underneath," "up," "down," "upper," "lower," "front," "rear," "forward" and "back" refer to the objects referenced when in the orientation illustrated in the drawings, which orientation is not necessary for achieving the objects of the invention.

The mechanism 10 includes a housing 20 and a rotating device 22 disposed in the housing 20. A displacement device 30 is disposed in the housing 20 and has undulating surfaces 32, 34. A cam 50 is connected to the rotating device 22 and has an undulating shape corresponding to the undulating surfaces 32, 34 of the displacement device 30.

In some embodiments, the displacement device 30 includes an outer portion 36 and cam-engaging portions 42, 44 located within the outer portion 36. Accordingly, the inner cam-engaging portions 42, 44 have the undulating surfaces 32, 34 for engaging the cam 50. However, in other embodiments, other configurations are possible, such as, for example, a single, integrally formed piece having a partially hollow center with undulating surfaces.

The displacement device 30 is slidably displaceable within the housing 20 along the longitudinal axis 24 of the rotating device 22. In certain embodiments, this is achieved via pins 46 disposed in slots 48 in the housing 20. The pins 46 are connected to the outer portion 36 of the displacement device 30, and may, for example, be fixedly attached to the outer portion 36, partially disposed in a cavity therein, or integrally formed therewith. However, in other embodiments, other configurations maybe employed. In certain embodiments, a friction reducing device is utilized to reduce the friction between the outer portion 36 and the housing 20 as the outer portion 36 slides therein, such as, for example, linear bearings or compression rings to offset the displacement device 30 from the housing 20.

Figures 2A, 2B:
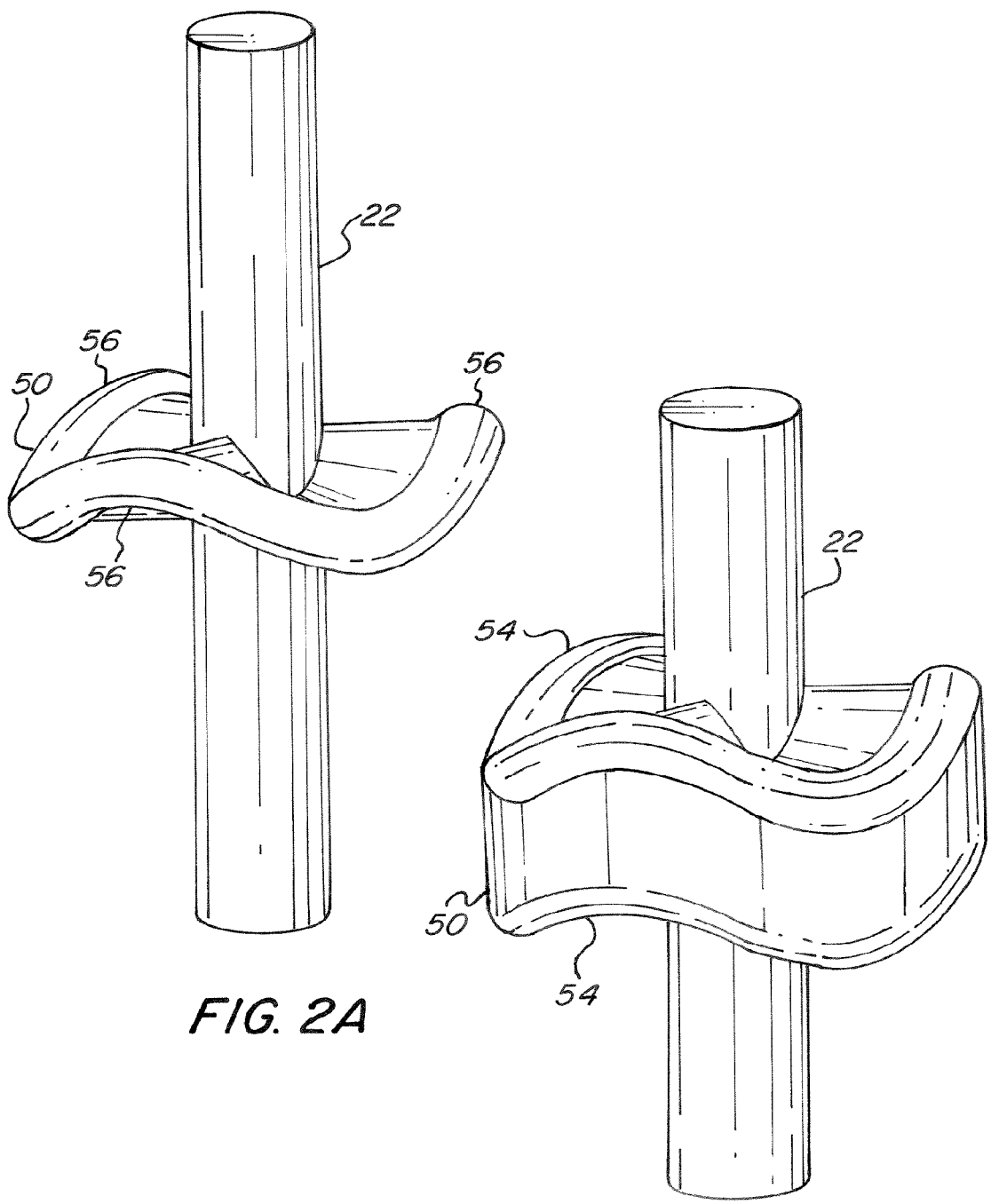
FIG. 2A is an isometric view of the rotating device and cam of the reciprocating axial displacement mechanism of FIG. 1.
FIG. 2B is an isometric view of the rotating device and cam of the reciprocating axial displacement mechanism of FIG. 1.

In certain embodiments, the cam 50 is connected to the rotating device 22 by a pin or other mechanism for fixedly attaching the cam 50 thereto. In other embodiments, the cam 50 is integrally formed with the rotating device 22. Several embodiments of the cam 50 are illustrated in FIGS. 2A-2B. As shown in FIG. 2A, in certain advantages embodiments, the entire cam 50 has an undulating shape. However, as shown in FIG. 2B, in other embodiments, the cam 50 simply has two undulating surfaces 52, 54 for engaging the undulating surfaces 32, 34 of the displacement device 30.

In certain advantageous embodiments, the cam 50 is a wave-shaped disk, while, in embodiments simply having surfaces 52, 54 as described above, the surfaces 52, 54 are wave-shaped. In some embodiments, this wave shape is sinusoidal.

Figure 3B:
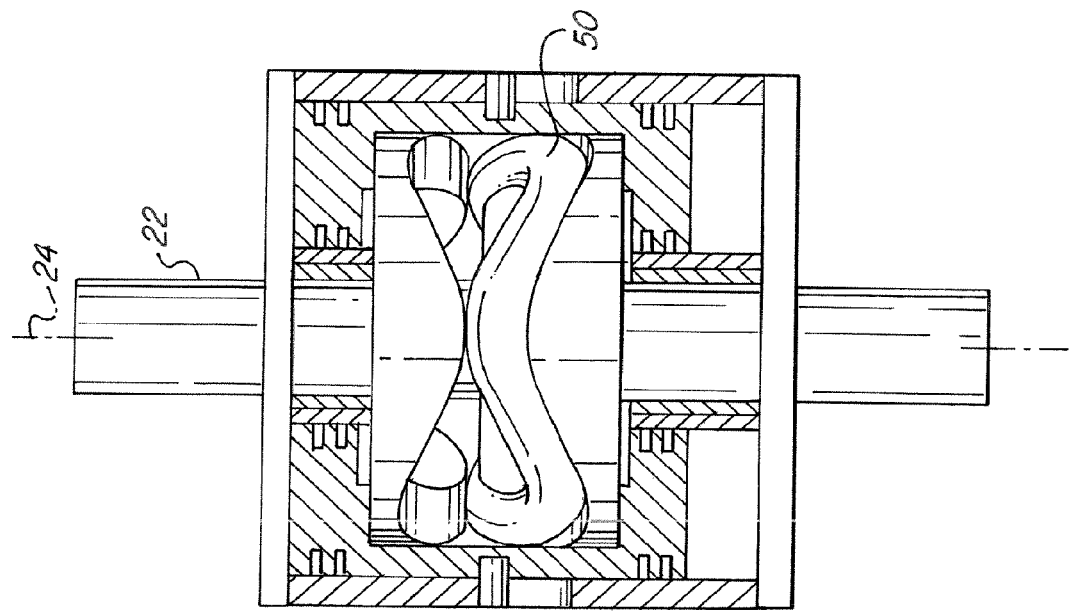
FIG. 3B is an exposed side view partially in cross-section of the reciprocating axial displacement mechanism of FIG. 3A in a different position.
Figure 3A:
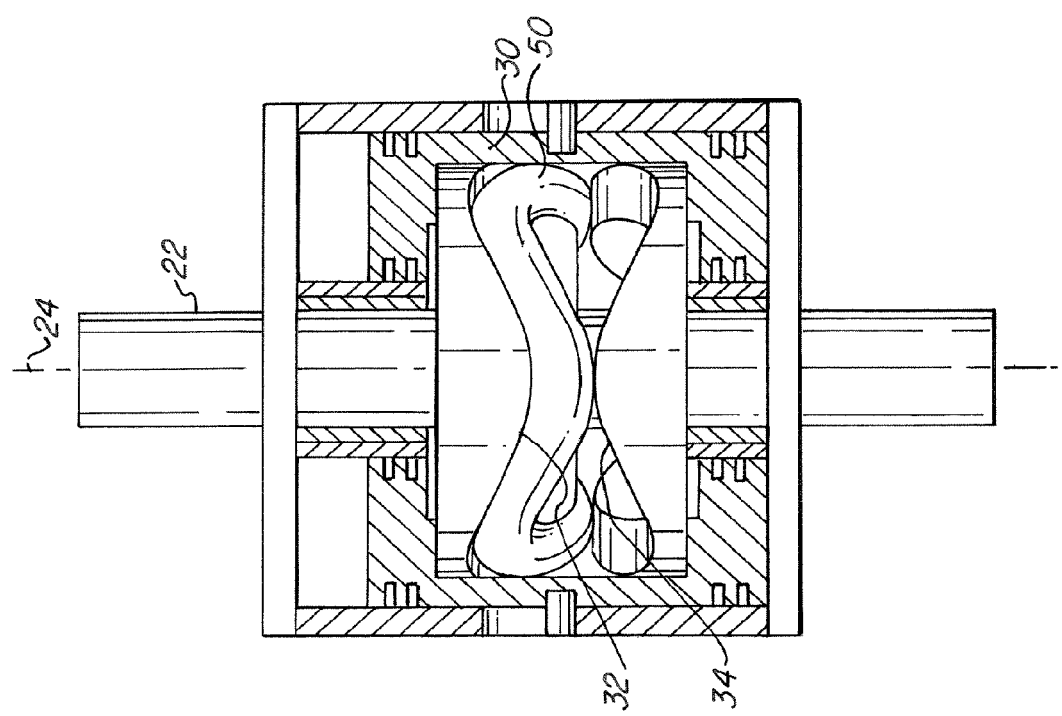
FIG. 3A is an exposed side view partially in cross-section of the reciprocating axial displacement mechanism of FIG. 1.

The operation of the reciprocating axial displacement mechanism is illustrated in FIGS. 3A-3B. As the rotating device 22 rotates, the cam 50 rotates with it. The displacement device 30, however, which may be secured by the pins 46 or in some other manner, does not rotate. Accordingly, the undulating surfaces of the cam 50 slide along the undulating surfaces 32, 34 of the displacement device 30, causing the displacement device to move back and forth along the rotational axis 24 of the rotating device 22.

In embodiments where many reciprocating strokes are desired, the cam 50 (or surfaces 52, 54) has many lobes 56, as additional lobes results in additional reciprocating strokes per revolution. In certain advantageous embodiments, the cam 50 (or surfaces 52, 54) has at least three lobes, thereby providing at least three points of contact, and thus, greater stability.

Figure 4:
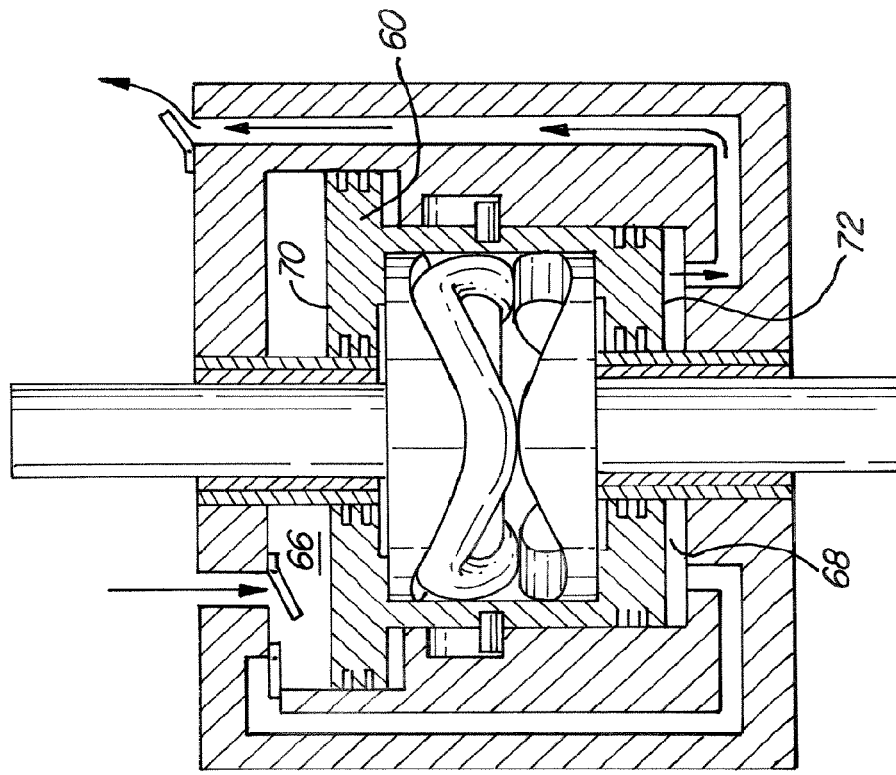
FIG. 4 is an exposed side view partially in cross-section of the reciprocating axial displacement mechanism of FIG. 1 as part of a double acting compressor.
Figure 5:
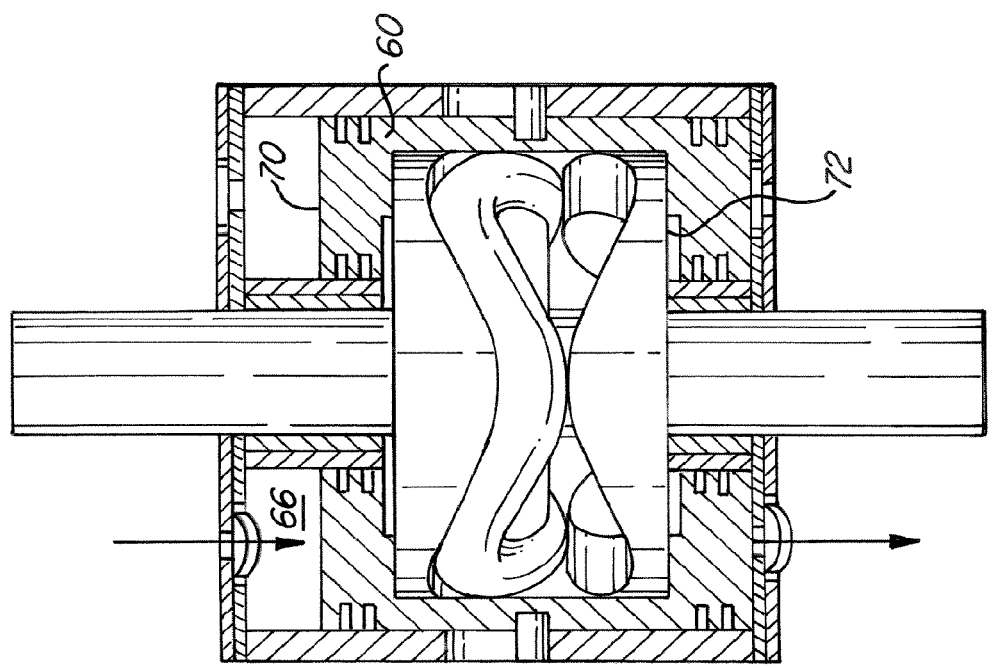
FIG. 5 is an exposed side view partially in cross-section of the reciprocating axial displacement mechanism of FIG. 1 as part of a two stage compressor.
Figure 6:
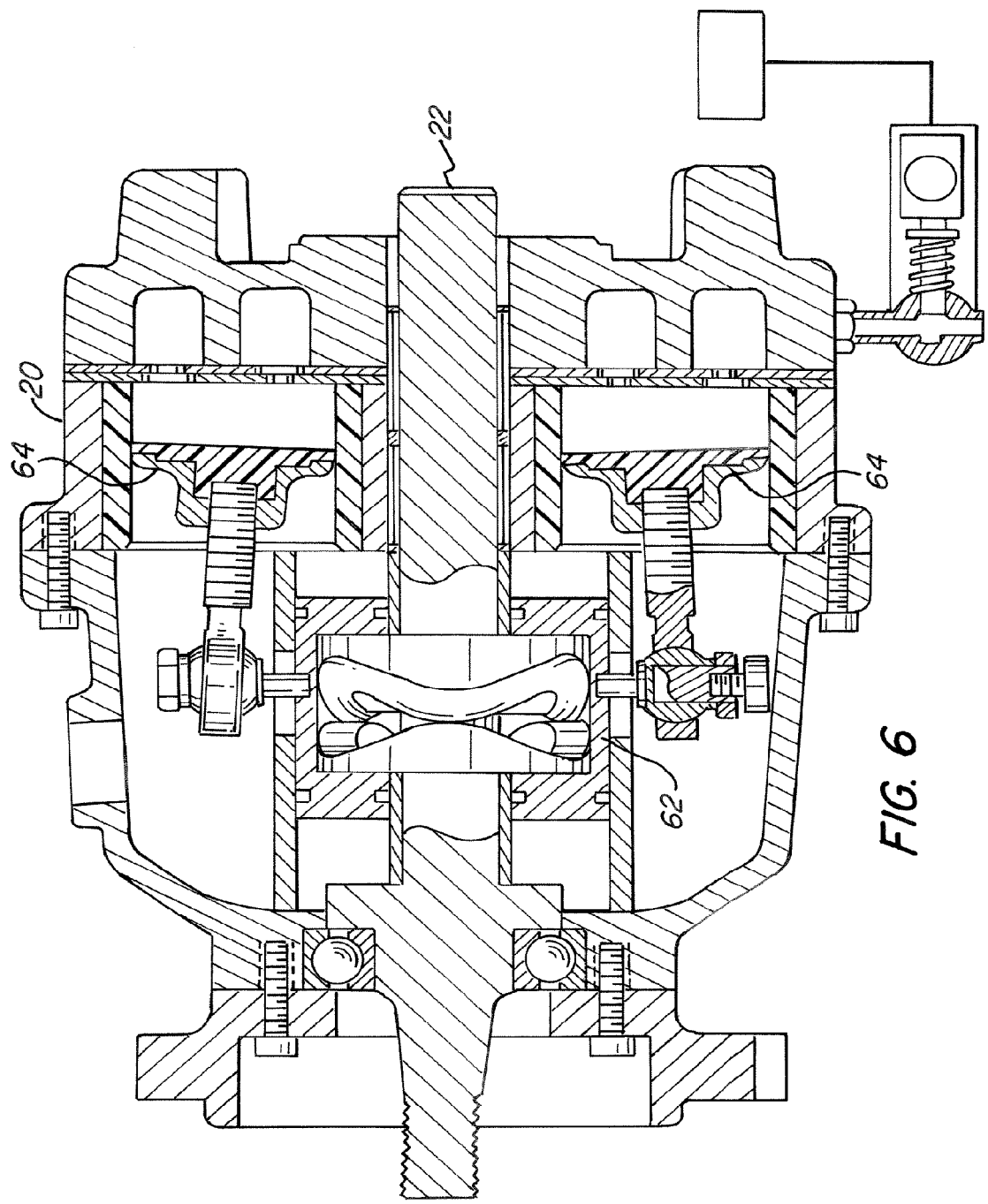
FIG. 6 is an exposed side view partially in cross-section of a compressor employing the reciprocating axial displacement mechanism of FIG. 1.

As illustrated in FIGS. 4-6, in certain embodiments, the housing 20 is a pump housing, such as that of a compressor, and the rotating device 22 is a drive shaft disposed in the compressor. In certain of these embodiments, the displacement device 30 is a pumping device, such as a piston 60 for compressing fluid. The other embodiments, the displacement device 30 is an actuator 62 for at least one piston 64 coupled thereto.

As illustrated in FIG. 4, because the motion of the pumping device 30 is reciprocal, in some embodiments, the pump housing 20 has compression chambers 66, 68 located on opposite sides of the pumping device 60, which has first and second faces 70, 72 for compressing fluid in the compression chambers 66, 68, respectively, thereby creating a double acting compressor. As shown in FIG. 5, in certain of these embodiments, the compression chamber 66 is in fluid communication with the compression chamber 68, and the second compression chamber 68 is smaller that the first compression chamber 66, thereby creating a two stage compressor.

It should be noted that, although the pumping device 30 has been described herein as a piston, it may comprise any pumping device requiring the axial motion described herein, such as a diaphragm, bellow, or other reciprocating device.

In certain advantageous embodiments, the mechanism 10 includes a fluid pathway for providing fluid to the cooperating undulating surfaces of the displacement device 30 and cam 50. For example, the rotating device 22 may include an inlet port 80 in fluid communication with a flow channel 82 inside the rotating device 22, which is, in turn, in fluid communication with an outlet port 84. A fluid—which could be either a lubricant or cooling air—enters the inlet port 80, flows through the channel 82, out through the outlet port 84, and contacts the undulating surfaces. In this way, friction is significantly reduced as the cam 50 slides along the surfaces 32, 34, thereby prolonging the life of the mechanism 10.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A reciprocating axial displacement mechanism, comprising:
    a housing;
    a rotating device disposed in said housing, said rotating device having a rotational axis,
    an undulating cam connected to said rotating device; and
    a displacement device disposed in said housing, said displacement device having first and second undulating surfaces;
    wherein said undulating cam is at least partially disposed between the first and second undulating surfaces of said displacement device such that, as said rotating device rotates relative to said displacement device, said undulating cam slides along the first and second undulating surfaces of said displacement device to displace said displacement device back and forth along the rotational axis of said rotating device.

2. A reciprocating axial displacement mechanism as claimed in claim 1, wherein said cam is integrally formed with said rotating device.

3. A reciprocating axial displacement mechanism as claimed in claim 1, wherein said cam comprises a wave-shaped disk.

4. A reciprocating axial displacement mechanism as claimed in claim 3, wherein the wave shape is sinusoidal.

5. A reciprocating axial displacement mechanism as claimed in claim 3, wherein said wave-shaped disk has at least three lobes.

6. A reciprocating axial displacement mechanism as claimed in claim 1, wherein said rotating device comprises a drive shaft.

7. A reciprocating axial displacement mechanism as claimed in claim 1, wherein said housing comprises a pump housing.

8. A reciprocating axial displacement mechanism as claimed in claim 7, wherein said displacement device comprises a pumping device.

9. A reciprocating axial displacement mechanism as claimed in claim 8, wherein said pumping device comprises a piston for compressing fluid.

10. A reciprocating axial displacement mechanism as claimed in claim 8, wherein said pumping device has first and second faces for compressing fluid at opposite ends of said pumping device.

11. A reciprocating axial displacement mechanism as claimed in claim 10, wherein said housing has first and second compression chambers adjacent the first and second faces of said pumping device.

12. A reciprocating axial displacement mechanism as claimed in claim 11, wherein;
    said second compression chamber is smaller that said first compression chamber; and
    said second compression chamber is in fluid communication with said first compression chamber.

13. A reciprocating axial displacement mechanism as claimed in claim 7, further comprising at least one pumping device, wherein said displacement device comprises an actuator for actuating said at least one pumping device.

14. A reciprocating axial displacement mechanism as claimed in claim 7, wherein said at least one pumping device comprises a piston for compressing fluid.

15. A reciprocating axial displacement mechanism as claimed in claim 7, wherein said at least one pumping device comprises a first pumping device at one end of said actuator and a second pumping device at the opposite end of said actuator.

16. A reciprocating axial displacement mechanism as claimed in claim 7, wherein said housing has first and second compression chambers adjacent to the first and second pumping devices respectively.

17. A reciprocating axial displacement mechanism as claimed in claim 16, wherein:
    said second compression chamber is smaller than said first compression chamber; and
    said second compression chamber is in fluid communication with said first compression chamber.

18. A reciprocating axial displacement mechanism as claimed in claim 16, wherein said displacement device comprises:
    an outer portion mounted to said housing such that said outer portion is slidable therein; and
    first and second cam-engaging portions disposed in said outer portion said first cam-engaging portion having the first undulating surface of said displacement device and said second cam-engaging portion having the second undulating surface of said displacement device.

19. A reciprocating axial displacement mechanism, as claimed in claim 18 herein:
    said housing comprises a plurality of slots; and
    said outer portion of said displacement device comprises a plurality of pins disposed in the plurality of slots.

20. A reciprocating axial displacement mechanism as claimed in claim 16, wherein said rotating device comprises;
    an inlet port for receiving a fluid;
    a channel for transferring the fluid received by said inlet port; and
    an outlet port in fluid communication with the first and second undulating surfaces of the displacement device.

21. A reciprocating axial displacement mechanism, comprising:
    a housing;
    a rotating device disposed in said housing, said rotating device having a rotational axis;
    a cam connected to said rotating device, said cam having first and second undulating surfaces; and
    wherein said cam is at least partially disposed between the first and second undulating surfaces of a displacement device such that, as said rotating device rotates relative to said displacement device, the first surface of said cam slides along the first surface of said displacement device and the second surface of said cam slides along the second surface of said displacement device to displace said displacement device back and forth along the rotational axis of said rotating device.

22. A reciprocating axial displacement mechanism as claimed in claim 21, wherein the first and second undulating surfaces of said cam are wave-shaped.

23. A reciprocating axial displacement mechanism as claimed in claim 22, wherein the wave-shapes are sinusoidal.

24. A reciprocating axial displacement mechanism, comprising:
 a pump housing having at least one piston channel;
 a shaft disposed in said pump housing, said shaft having a rotational axis;
 an undulating cam connected to said shaft;
 an actuator disposed in said pump housing, said actuator having first and second undulating surfaces; and
 at least one piston coupled to said actuator and slidably disposed in the at least one piston channel;
 wherein said undulating cam is at least partially disposed between the first and second undulating surfaces of said actuator such that, as said shaft rotates relative to said actuator, said undulating cam slides along the first and second undulating surfaces of said actuator to displace said at least one piston back and forth within the at least one piston channel.

25. A reciprocating axial displacement mechanism as claimed in claim 24, wherein said cam comprises a wave-shaped disk.

26. A reciprocating axial displacement mechanism as claimed in claim 25, wherein the wave shape is sinusoidal.

* * * * *